(12) United States Patent
Kim

(10) Patent No.: US 7,114,729 B2
(45) Date of Patent: Oct. 3, 2006

(54) VEHICLE REAR SUSPENSION

(75) Inventor: Byong Cheol Kim, Seoul (KR)

(73) Assignee: Hyundai Motor Company, Seoul (KR)

(*) Notice: Subject to any disclaimer, the term of this patent is extended or adjusted under 35 U.S.C. 154(b) by 353 days.

(21) Appl. No.: 10/734,895

(22) Filed: Dec. 11, 2003

(65) Prior Publication Data

US 2005/0029770 A1 Feb. 10, 2005

(30) Foreign Application Priority Data

Aug. 5, 2003 (KR) ...................... 10-2003-0054177

(51) Int. Cl.
*B60G 17/016* (2006.01)
(52) U.S. Cl. .............................. 280/5.513; 280/124.128
(58) Field of Classification Search ......... 280/124.128, 280/5.513, 5.507, 5.52, 5.521, 86.75, 6.157
See application file for complete search history.

(56) References Cited

U.S. PATENT DOCUMENTS

| | | | | |
|---|---|---|---|---|
| 1,242,495 A | * | 10/1917 | Thomas | 267/27 |
| 2,080,546 A | * | 5/1937 | Rudoni | 267/278 |
| 2,576,824 A | * | 11/1951 | Ean | 267/250 |
| 3,199,892 A | * | 8/1965 | Boys | 280/683 |
| 3,510,149 A | * | 5/1970 | Raidel | 280/86.75 |
| 3,694,000 A | * | 9/1972 | Van Winsen | 280/124.128 |
| 3,858,902 A | * | 1/1975 | Howells et al. | 280/6.159 |
| 4,379,572 A | * | 4/1983 | Hedenberg | 280/86.75 |
| 4,488,736 A | * | 12/1984 | Aubry et al. | 280/5.52 |
| 4,537,420 A | * | 8/1985 | Ito et al. | 280/86.75 |
| 4,775,025 A | * | 10/1988 | Parker et al. | 180/219 |
| 4,890,859 A | * | 1/1990 | Drott | 280/6.157 |
| 4,991,868 A | * | 2/1991 | VanDenberg | 280/86.75 |
| 5,775,719 A | * | 7/1998 | Holden | 280/86.75 |
| 6,206,391 B1 | * | 3/2001 | Speth et al. | 280/124.128 |
| 6,659,479 B1 | * | 12/2003 | Raidel et al. | 280/86.75 |
| 6,688,616 B1 | * | 2/2004 | Ziech | 280/86.751 |
| 2004/0046347 A1 | * | 3/2004 | Lee | 280/124.128 |

FOREIGN PATENT DOCUMENTS

| | | |
|---|---|---|
| DE | 1530745 | 4/1964 |
| DE | 4323024 | 1/1994 |
| DE | 1976697 | 10/1998 |
| JP | 61-041605 | 2/1986 |
| JP | 06-024227 | 2/1994 |
| JP | 08-196117 | 8/1996 |
| JP | 10-044737 | 2/1998 |
| JP | 10-217735 | 8/1998 |
| JP | 2003-002106 | 1/2003 |

* cited by examiner

*Primary Examiner*—Paul N. Dickson
*Assistant Examiner*—Barry Gooden, Jr.
(74) *Attorney, Agent, or Firm*—Morgan Lewis & Bockius LLP

(57) ABSTRACT

An anti-lift characteristic of a rear suspension of a vehicle is enhanced by including a carrier at which a rear wheel is rotatably mounted; a trailing arm longitudinally aligned with respect to a vehicle body, ends of the trailing arm being respectively connected to the carrier and the vehicle body; and a connecting unit connecting the vehicle body and a body-side end of the trailing arm, and varying a vertical position of the body-side end according to a running state of the vehicle.

3 Claims, 3 Drawing Sheets

VEHICLE REAR SUSPENSION

CROSS-REFERENCE TO RELATED APPLICATIONS

This application claims priority of Korean Application No. 10-2003-005 4177, filed on Aug. 5, 2003, the disclosure of which is incorporated fully herein by Reference.

FIELD OF THE INVENTION

Generally, the present invention relates to a vehicle. More particularly, the present invention relates to a rear suspension for a vehicle.

BACKGROUND OF THE INVENTION

In general, dynamic behavior of a vehicle is controlled by the suspension system of the vehicle. Such a vehicle suspension system includes individual suspensions disposed at each of front-left, front-right, rear-left, and rear-right corners of the vehicle.

In designing the vehicle suspension system, reduction of nose dive behavior of the vehicle is taken into account. The nose dive behavior indicates a behavior in which the vehicle body is inclined, that is, a behavior in which a front of the vehicle is lowered and a rear of the vehicle is raised.

In order to reduce such a nose dive behavior, in general, a front suspension is designed to enhance its anti-dive characteristic, and a rear suspension is designed to enhance its anti-lift characteristic.

In a typical rear suspension, a carrier (also called a knuckle) at which a wheel is rotatably mounted is linked to the vehicle body via at least one linking member. Among the linking members, a linking member that lies along a longitudinal axis of the vehicle is called a trailing arm.

Anti-lift characteristics of the rear suspension can be effectively enhanced by raising the vertical position of the body-side connection point of the trailing arm, i.e., raising the pivoting center of the trailing arm. When a braking force is applied to a rear wheel, the trailing arm receives a torque to rotate toward the vehicle body. Therefore, when the pivoting center of the trailing arm is raised, the trailing arm receives a greater torque to rotate toward the vehicle body, and accordingly the anti-lift characteristic of the rear suspension is enhanced.

However, when the pivoting center of the trailing arm is raised, a spring supporting the trailing arm shows a poorer extension/compression trajectory, and this deteriorates a trajectory of the rear wheel.

In this sense, according to the prior art, the vertical position of the pivoting center of the trailing arm is compromised such that the trajectory of the rear wheel is not excessively deteriorated. Therefore, enhancement of the anti-lift characteristic is very limited.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a rear suspension for a vehicle having a non-limiting advantage of enhanced anti-lift characteristics without substantially deteriorating the trajectory of the rear wheels of the vehicle while braking.

The term "trailing arm", in a narrow meaning, may mean an arm whose pivot axis lies perpendicular to a longitudinal axis of the vehicle body, and is differentiated from the term "semi-trailing arm" with a pivot axis that meets the longitudinal axis of the vehicle body at a non-zero angle.

However, in this specification and in the appended claims, the term trailing arm should not be understood to be limited by its angle with the longitudinal axis of the vehicle body. To the contrary, the term trailing arm is used herein in a broadest meaning of a linking member, that is, lying substantially or at least approximately along a longitudinal axis of a vehicle body, connects the vehicle body and a carrier.

An exemplary rear suspension of a vehicle according to an embodiment of the present invention includes a carrier, a trailing arm, and a connecting unit. A rear wheel is rotatably mounted at the carrier. The trailing arm is longitudinally aligned with respect to a vehicle body, and ends of the trailing arm are respectively connected to the carrier and the vehicle body. The connecting unit connects the vehicle body and a body-side end of the trailing arm, and varies a vertical position of the body-side end according to a running state of the vehicle.

In a further embodiment, the connecting unit includes a bracket, a hinge pin, and a positioning apparatus. The bracket has a slot formed along a predetermined direction having a vertical component. The hinge pin penetrates the slot and the body-side end of the trailing arm. The positioning apparatus adjusts a position of the hinge pin in the slot. In this case, it is preferable that the slot is vertically formed.

In a yet further embodiment, the positioning apparatus includes a cylinder, a piston, an actuator, and a linking member. The cylinder has a receiving hole for receiving hydraulic pressure. The piston is disposed in the cylinder so as to form a hydraulic pressure chamber in the cylinder. The actuator is fixed to the piston and extends outward of the hydraulic pressure chamber at an opposite side thereof. The linking member connects the actuator and the hinge pin. In this case, the receiving hole of the cylinder is preferably connected to a brake line of the vehicle.

The hinge pin is preferably located at a lowest position of a slot when the vehicle is not under braking operation.

It is preferable that an embodiment of the present invention further includes a restoring apparatus for restoring a position of the piston in the case that the hydraulic pressure supplied to the hydraulic pressure chamber is released. In this case, the restoring apparatus preferably includes an elastic member applying an elastic force on the piston toward the receiving hole.

In a further alternative embodiment of a suspension system according to the invention, a piston and cylinder are adapted to be secured relative to a vehicle body, the piston having rearward extending piston rod. A bracket is adapted to be secured relative to the vehicle body at a position rearward of the piston and cylinder. The bracket defines a slot extending at least partly in a vertical direction relative to the vehicle, with the slot being configured and dimensioned to receive a pivotally mounted forward end of a suspension trailing arm. A linking member extends between the piston rod and bracket slot wherein the linking member is configured for pivotal connection with the suspension trailing arm and vertically moveable in the slot.

Preferably, a biasing element is disposed to bias the piston in a forward direction. Also, the cylinder preferably communicates with a vehicle brake system such that the piston rod is extended when vehicle brakes are applied.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
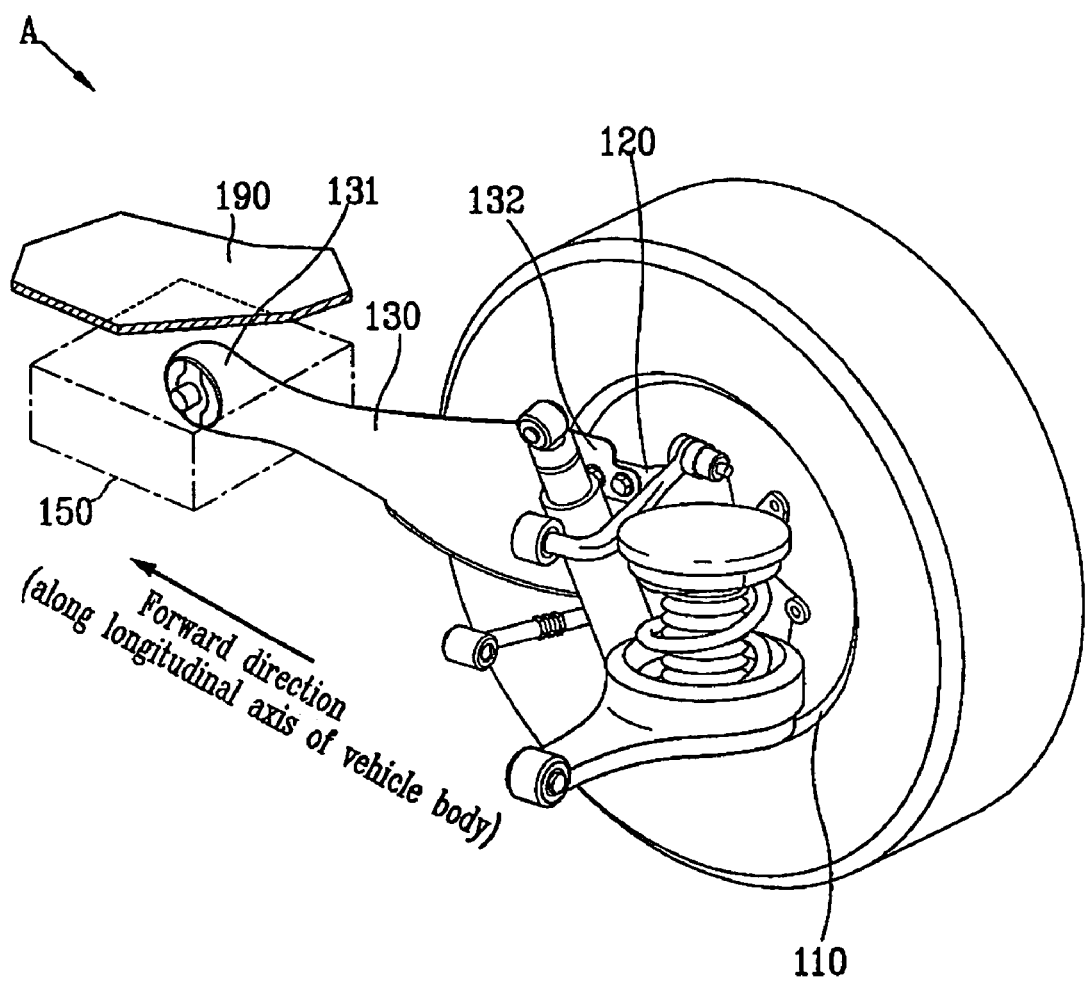
FIG. 1 is a schematic diagram of a rear suspension according to an embodiment of the present invention.

As shown in FIG. 1, a rear suspension according to an embodiment of the present invention is a rear suspension of a vehicle having a vehicle body 190, and includes a carrier 120, a trailing arm 130, and a connecting unit 150.

A rear wheel 110 is rotatably mounted at the carrier 120. The trailing arm 130 is longitudinally aligned with respect to the vehicle body 190. One end 132 of the trailing arm 130 is connected to the carrier 120, and another end of the trailing arm 130 is connected to the vehicle body 190. The connecting unit 150 connects the vehicle body 190 and a body-side end 131 of the trailing arm 130. The connecting unit 150 varies a vertical position of the body-side end 131 according to a running state of the vehicle.

FIG. 1 illustrates an embodiment in which the spirit of the present invention is applied to a 4-link suspension, and the function of each illustrated member is obvious to a person of ordinary skill in the art. However, the scope of the present invention is not limited as illustrated in FIG. 1, and the present invention can be applied to any type of rear suspension that includes the trailing arm 130.

Figure 2:
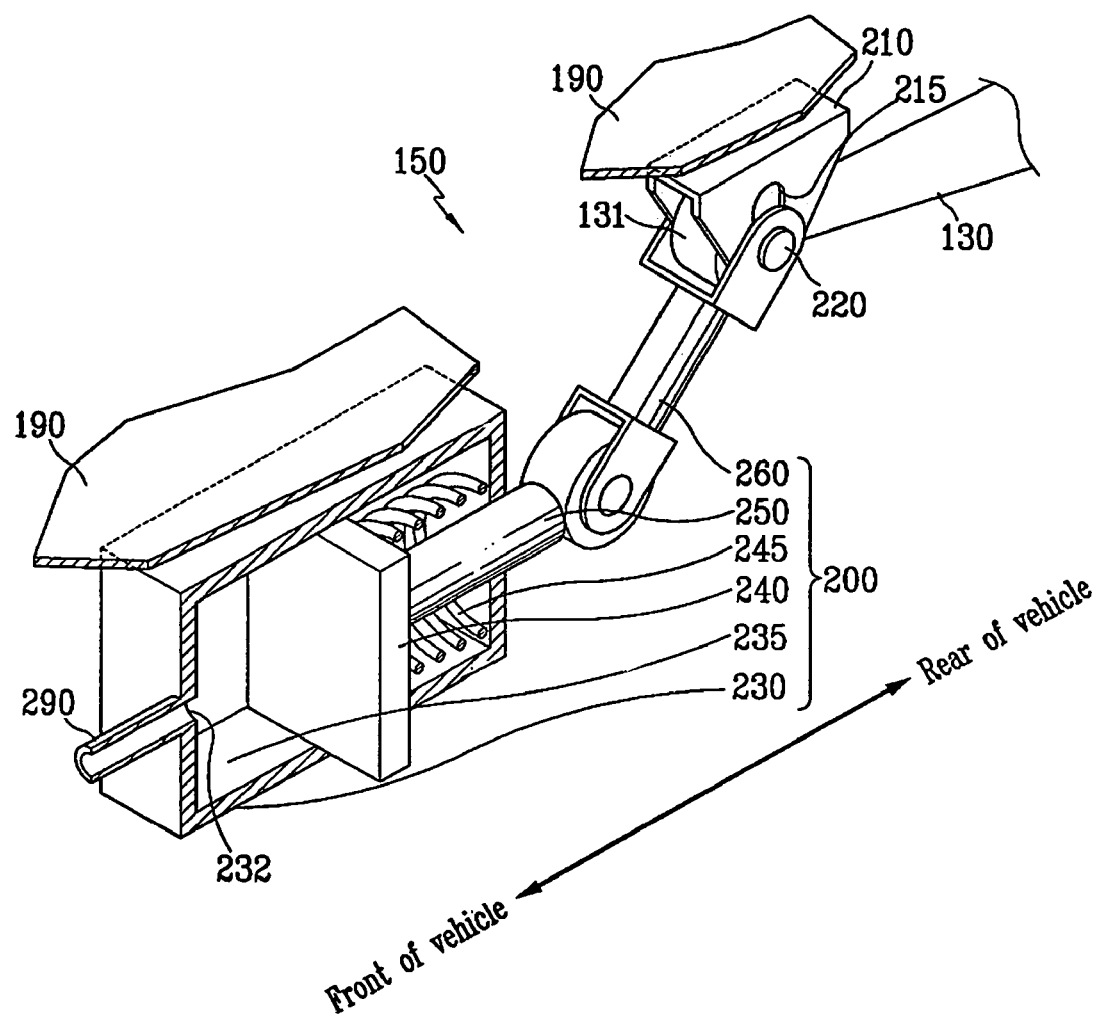
FIG. 2 is a perspective view taken along a direction A of FIG. 1.

The connecting unit 150 is shown in further detail in FIG. 2.

As shown in FIG. 2, the connecting unit 150 includes a bracket 210, a hinge pin 220, and a positioning apparatus 200. The bracket 210 has a slot 215 formed along a predetermined direction having a vertical component. The hinge pin 220 penetrates the slot 215 and the body-side end 131 of the trailing arm 130. The positioning apparatus 200 adjusts a position of the hinge pin 220 in the slot 215.

Figure 3:
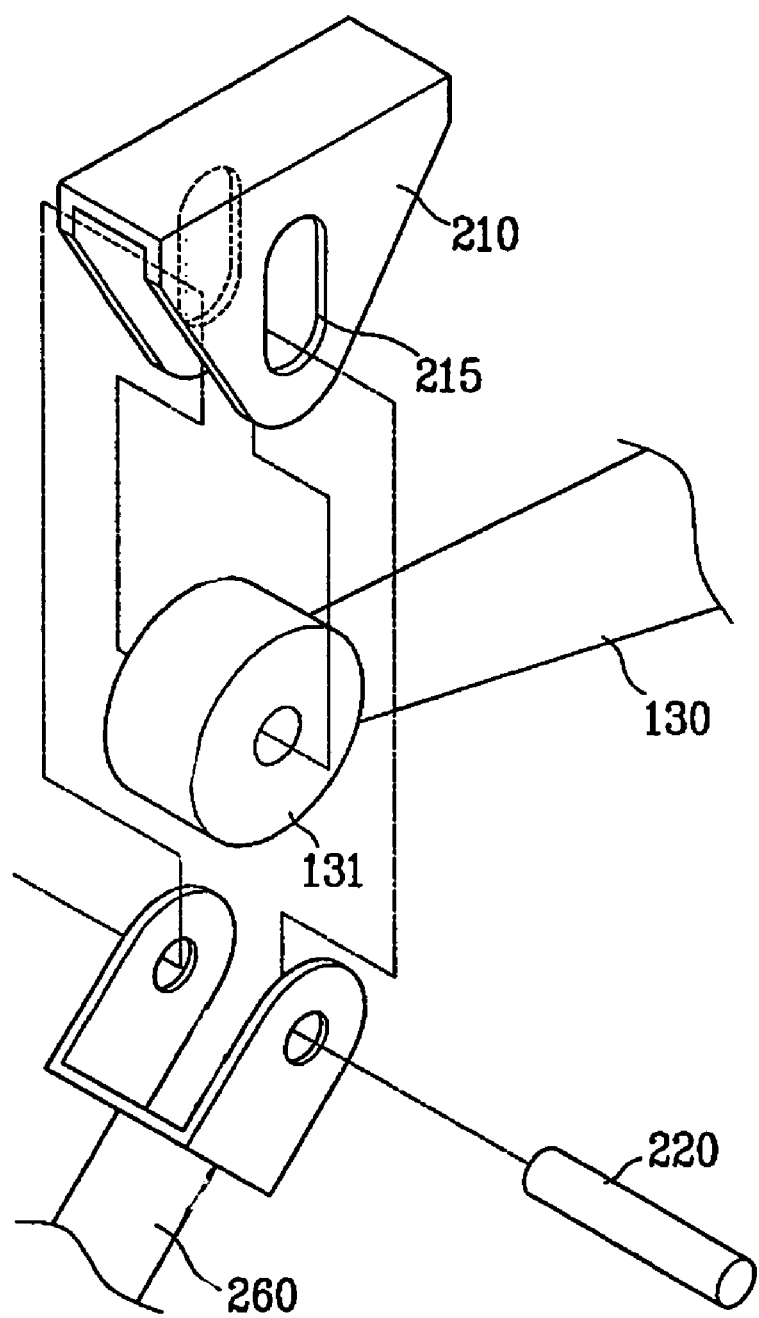
FIG. 3 is an exploded perspective view showing a connection of a bracket, a hinge pin, and a trailing arm according to an embodiment of the present invention.

FIG. 3 is an exploded perspective view for showing connection of the bracket 210, the hinge pin 220, and the trailing arm 130 according to an embodiment of the present invention.

As shown in FIG. 3, the body-side end 131 of the trailing arm 130 is rotatably fixed with a linking member 260, which is described in further detail later, by the hinge pin 220. In addition, the body-side end 131 of the trailing arm 130 is engaged with the bracket 210 by the hinge pin 220, and in this case, the hinge pin 220 is inserted through the slot 215 of the bracket 210.

Therefore, a vertical position of the hinge pin 220, that is, a vertical position of the body-side end 131 of the trailing arm 130, can be varied along the slot 215.

In general, averaging the movements of the trailing arm 130, the trailing arm 130 can be considered to be almost horizontally aligned. Therefore, it is preferable that the slot 215 is vertically formed. That is, the above mentioned predetermined direction is preferably a vertical direction.

The vertical direction of the slot 215 may prevent change of the position of the hinge pin 220 in the slot 215 when a force, such as a braking force, is applied to the wheel 110 in a direction parallel to a road (equivalently, a vehicle body plane).

In addition, such an external force parallel to the vehicle body plane acts on the hinge pin 220 vertically to the slot 215. Therefore, movement of the position of the hinge pin 220 along the slot 215 requires minimal force, even when a braking force is acting on the wheel 110.

The positioning apparatus 200 includes a cylinder 230, a piston 240, an actuator 250, and a linking member 260. The cylinder 230 has a receiving hole 232 for receiving hydraulic pressure. The piston 240 is disposed in the cylinder 230 so as to form a hydraulic pressure chamber 235 in the cylinder 230. The actuator 250 is fixed to the piston 240 and extends exterior to the hydraulic pressure chamber 235 at an opposite side thereof. The linking member 260 connects the actuator 250 and the hinge pin 220.

In FIG. 2, the cylinder 230 and the piston 240 are illustrated as square, however they may have any other shape, e.g., round.

The receiving hole 232 of the cylinder 230 is connected to a brake line 290 of the vehicle. Therefore, when the vehicle decelerates under a brake operation of a driver, brake fluid is supplied to the hydraulic pressure chamber 235 through the receiving hole 232.

An elastic member 245 is disposed in the cylinder 230 such that the elastic member exerts its elastic force on the piston 240 toward the receiving hole 232. Therefore, in the case that the hydraulic pressure supplied to the hydraulic pressure chamber 235 is released, the piston 240 recovers its initial position by the elastic force of the elastic member 245. FIG. 2 illustrates the elastic member 245 as a coil spring, however, the elastic member 245 may be realized by any other elastic member that can apply a restoring force to the piston 240.

When the vehicle is not under braking operation of a driver, that is, when a braking hydraulic pressure is not supplied to the hydraulic pressure chamber 235, the piston 240 is moved left in FIG. 2 by the elastic member 245, and accordingly the hinge pin 220 is located at a lowest position of the slot 215.

An anti-lift characteristic can be enhanced since a rear suspension according to an embodiment of the present invention operates as follows.

When a braking hydraulic pressure is supplied to the hydraulic pressure chamber 235 through the brake line 290 according to a braking operation of a driver, the hydraulic pressure pushes the piston rightward in FIG. 2. Accordingly, the actuator 250 pushes the linking member 260, and in turn, the linking member 260 pushes the hinge pin 220 upward. Consequently, the vertical position of the pivoting axis of the trailing arm 130 is raised, and therefore, the torque acting on the trailing arm 130 (in a counterclockwise direction in FIG. 2) according to the braking force is also raised.

Accordingly, a tendency for the rear wheel 110 to move close to the vehicle body 190, i.e., the anti-lift characteristic, is increased during brake operation of the vehicle.

According to an embodiment of the present invention, the vertical position of a body-side end of a trailing arm is adjusted according to a running state of a vehicle, and accordingly an anti-lift characteristic of the vehicle is enhanced.

The anti-lift characteristic is enhanced in an efficient manner, since a slot is formed at a bracket connecting a vehicle body and a body-side end of the trailing arm, and the vertical position of a hinge pin connecting the bracket and the body-side end of the trailing arm is adjusted.

Vertical alignment of the slot minimizes a force required for controlling vertical position of the body-side end of the trailing arm.

Adjustment of the vertical position of the body-side end of the trailing arm is efficiently realized by utilizing braking hydraulic pressure that is generated by braking operation of a driver.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A rear suspension for a vehicle body having a vehicle body, the suspension comprising:

a piston and cylinder adapted to be secured relative to the vehicle body, said piston having a rearward extending piston rod;

a bracket adapted to be secured relative to the vehicle body at a position rearward of said piston and cylinder, said bracket defining a slot extending at least partly in a vertical direction relative to the vehicle and said slot being configured and dimensioned to receive a pivotally mounted forward end of a suspension trailing arm; and a linking member extending between said piston rod and bracket slot wherein the linking member is configured for pivotal connection with the suspension trailing arm and vertically moveable in said slot.

2. The rear suspension of claim 1, further comprising a biasing element disposed to bias said piston in a forward direction.

3. The rear suspension of claim 2, wherein said cylinder communicates with a vehicle brake system such that the piston rod is extended when vehicle brakes are applied.

* * * * *